Nov. 13, 1962 J. R. JENNINGS 3,064,129
SPEED INDICATING DEVICE
Filed July 17, 1959

INVENTOR.
John R. Jennings

United States Patent Office 3,064,129
Patented Nov. 13, 1962

3,064,129
SPEED INDICATING DEVICE
John R. Jennings, Belmont, Calif., assignor to Optics
Technology, Inc., a corporation of California
Filed July 17, 1959, Ser. No. 827,775
9 Claims. (Cl. 250—83.3)

This invention relates to a device for and a method of optically viewing an object to determine the relative speed of movement between the object and a reference or viewing point.

The invention particularly relates to an adaption of the Doppler system to the measurement of relative travel of objects giving off infrared radiation to obtain a direct voltage reading which is an analogue of the relative speed between the object and the reference point.

The principal object of this invention is to provide a simple optical device which incorporates filters in such a way that the infrared radiation from a sighted object is directed through two filter paths each tuned to a different frequency and the intensity of the radiation in the paths are converted to voltages which are, in a cancelling circuit, compared to provide an output voltage either negative or positive in accordance with the direction of travel and in which the value of the voltage is an analogue of the relative speed of the sighted object.

Another object of this invention is to provide a device for measuring relative speed by sighting predetermined infrared producing elements by employing a first filter path formed to provide a narrow band pass tuned to a frequency slightly above the characteristic frequency of the element and a second filter path formed to provide an equally narrow band pass but tuned slightly below the characteristic frequency of the element and thereafter detecting the infrared radiation in each path to convert the radiation to voltage values which are applied to a cancelling circuit to provide a differential voltage output which is an analogue of the relative speed of the sighted element.

A feature and advantage of this invention is that when the output voltages of the two infrared detectors are balanced against one another in cancelling relation while the viewed element is at rest the resultant voltage output will be substantially zero whereinafter if a similar sighted element is in motion either toward or away from the sensing device (causing the frequency to either decrease or increase in accordance with the Doppler principle) either one or the other of the two filter paths will pass more infrared radiation or light and the other path will pass less infrared radiation or light. This result is obtained due to the apparent frequency of the element shifting more closely to the band pass frequency of one or the other of the two filter paths thus giving an unbalanced voltage difference which is an analogue of the speed of the viewed element so that upon calibration a direct reading of relative speed and direction can be obtained.

A further object of this invention is to provide a speed sensing apparatus operating on the optical principle having inherent compensating features which compensate for variations in apparent intensity of light output of the object viewed.

Still a further object of this invention is to provide a device employing a single infrared filter of the type having a narrow band pass in which the frequency of maximum light transmission is determined by the angle that radiation is directed through the filter. A beam splitter is arranged to divide radiation emanating from a single source into two paths one passing through the filter normal to the broad face of the filter and the other passing through the filter at an angle other than normal to the broad face of the filter and in which a detecting device is arranged to detect the intensity of radiation passing through each of the respective paths through the filter so that the differential of light transmission through the respective two paths can be compared.

Another feature and advantage of this invention is that the device enables direct comparison of two signals from a single source on the basis of frequency variation without the necessity of compensation for variation in the intensity of the light output from the source.

A still further object of this invention is to provide a method for determining the speed of an infrared radiation producing element traveling toward or away from a reference point including the steps of filtering the radiation from the element through a filter path tuned to a frequency slightly below the characteristic frequency of the infrared producing element then passing a portion of the same infrared radiation through a second filter path tuned above the frequency of the characteristic frequency of the infrared producing element and thereafter sensing the relative radiation intensity passing through both filters to obtain a comparative output which is a direct analogue of the relative speeds of the infrared producing element.

Other objects of the present invention will become apparent upon reading the following specification and referring to the accompanying drawings in which similar characters of reference represent corresponding parts in each of the several views.

Figure 1:
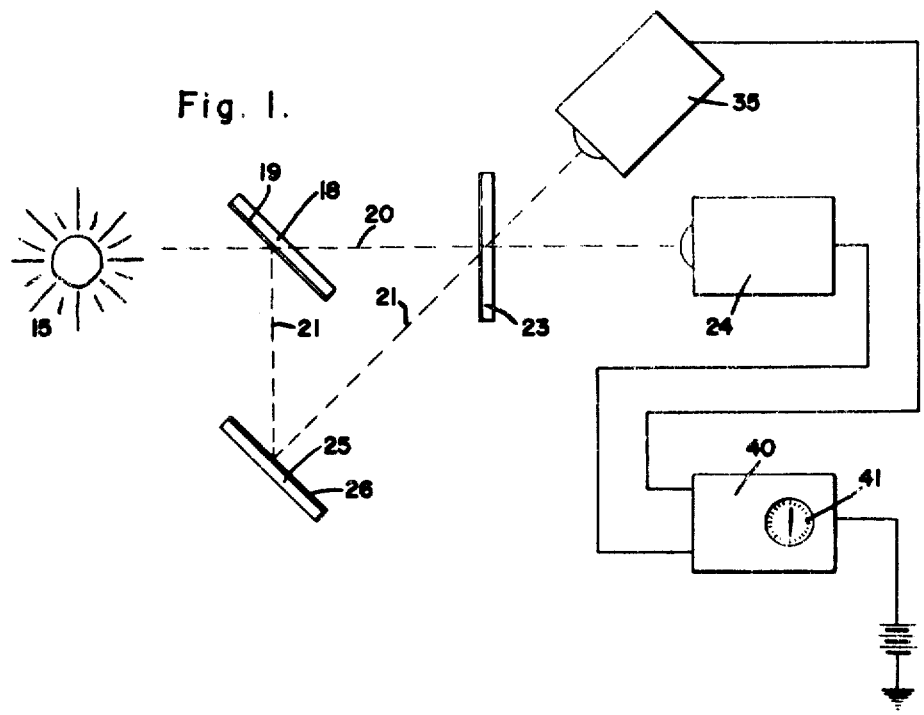
FIG. 1 is a diagrammatical view of the speed detector showing the infrared filtering and reflecting arrangement, detectors and measuring apparatus.

It is well known that if an object giving off radiation moves toward a viewer that the frequency of the radiated signal emitted from the object increases with the increase of the rate of speed toward the viewer and that when the object moves away from the viewer the apparent frequency of the radiation from the object decreases. This effect is known as the Doppler effect and has been effectively used in radar, sound measurement and infrared optical devices to determine relative speeds of objects moving either toward or away from a given reference point.

This effect is illustrated by the formula $$V^1 = \left(1 + \frac{u}{c}\right)$$

where $V^1$ equals the apparent or new frequency, $V$ equals the characteristic frequency of the radiation from the object, $u$ equals the relative velocity of motion of the object and $c$ equals the velocity of the radiation or light.

In the principal embodiment of this invention an infrared radiation emitting source, such as for example the sun or the exhaust pipe of a jet or rocket, as viewed with reference to a selected element having a known characteristic frequency. The element may be hydrogen, mercury or any of the other elements which may be plentiful in the viewed object.

The infrared radiation viewed from the given source is then split by a beam splitter and divided into two beams which are directed at different angles through a narrow band pass filter. The frequency for maximum light transmission for each of the beams is arranged so that one of the filter paths is tuned above the characteristic frequency of the selected element and the other filter path is tuned below the characteristic frequency of the selected element. The intensity of the radiation passing through each of the paths is then measured and compared with one another to provide differential output which can be calibrated to obtain a direct reading which is indicative of the relative speed of the sighted object.

It is well known that most multi-layer filters will pass maximum radiation as a lower frequency when the radiation is directed straight through the filter than when the radiation is passed through the filter at an angle. Thus the tuning of the filter varies as the angle of the pasasge of radiation through the filter varies from normal. Thus in the device of this invention the infrared radiation from the selected source is split by a beam splitter so that the beam will pass simultaneously through the filter at an angle normal to the broad face of the filter and the other half of the beam will pass through the filter at an angle substantially off normal. Thus the tuned frequency of the filter for the first half of the beam will be substantially lower than the tuned frequency for the second half of the beam.

First and second detectors or transducers are arranged to detect the intensity of the radiation passing through the filter from the first and second passes respectively so that a voltage output can be obtained from each detector which is directly proportional to the intensity of radiation passing through each of the respective paths.

The detector may be a photoelectric cell which either developes its own voltage or it changes in resistance in accordance with the amount of radiation received by the device. The detector, of course, should be receptive to radiation within the frequency range of the characteristic frequency of the object or element viewed.

To effectively utilize the device the filter is constructed so that the band pass to the infrared radiation passing normal to the broad face of the filter is directed to a frequency slightly above the characteristic frequency of the element to be viewed and the band pass for the radiation passing through the filter at an angle is slightly lower than the characteristic frequency of the selected element to be viewed. The output of the first and second detectors are balanced so that when the element viewed is at rest the voltage outputs from the first and second detectors will be substantially equal. Thereafter when the object viewed moves toward the measuring device the apparent frequency of the element viewed will increase.

Under these conditions a higher percentage of the radiation will pass through the first filter path to the first detector and a smaller percentage of the radiation will pass through the second filter path to the second detector. Thus there will be an unbalance of voltage output from the two detectors which is directly related to, or an analogue of, the relative speed of the element viewed.

When the element is moving in the opposite direction the opposite effect will take place, that is, the voltage output of the second detector will be greater than the voltage output of the first detector thus giving an unbalanced voltage output of opposite polarity which is directly indicative of movement of the object in the opposite direction and the actual differential is a direct analogue of the speed of the object viewed.

Referring to FIG. 1 of the drawings the light source to be viewed is indicated at 15. The light source is arranged to strike a mirror 18 which functions as a $$\frac{1}{1}$$

beam splitter. This is obtained by providing mirror 18 with a coating 19 which will transmit half the light within a relatively wide band pass including the characteristic frequency of the element of interest within light source 15. The passage of one half the light through mirror 18 is arranged to pass through a filter 23 at right angles to the broad face of the filter and is indicated by dotted line 20.

The amount of radiation in path 20 passing through filter 23 is sensed by a detector 24. The other half of the light is reflected by coating 19 of mirror 18, as indicated by dotted line 21, to a second mirror 25.

Second mirror 25 is coated with a coating 26 which is completely reflective to all light within the range of the characteristic frequency of the element to be viewed.

Mirror 25 is positioned to reflect the light through the first filter 23 to a second light detector 35 at an angle many degrees off of normal.

Filter 23 is a multi-coated filter such as for example shown in the American Institute of Physics Handbook at pp. 4–47, published by McGraw-Hill Publishing Company, first edition copyrighted 1957. Such filters having a multi-coating on the base material have the characteristic hereinabove set forth wherein the frequency of maximum radiation transmission of the filter decreases as the angle of light passing through the filter varies from normal.

Filter 23 is constructed to have maximum light transmission in a band which is slightly higher in frequency than the characteristic frequency of the element to be viewed. The angle of the reflected light passing through the filter is arranged so that the filter will pass maximum radiation transmission at a frequency band slightly lower than the material to be viewed. For example if mercury is the selected element, which has a characteristic frequency of 1.014 microns, the filter would be constructed to be tuned to a frequency of 1.10 microns to light passing through the filters at right angles to the broad face of the filter and the angle of light path 21 would be arranged so that the filter would offer maximum light transmission to light passing through the filter at the frequency of 0.9000 microns.

The output from the two sensing devices 24 and 35 is fed to a balanced bridge circuit 40 in which the comparative output of the two signals from sensing devices 24 and 35 is indicated by galvanometer 41. The galvanometer is arranged to indicate a positive output if the signal from detector 24 is greater than the signal from detector 35 and a negative output if the signal from detector 35 is greater.

To initially set up the device the device is split with a signal being sighted on an object having the selected material such as for example mercury which gives off radiation of the characteristic frequency of the element while the sighted object is at rest. The output of balanced bridge 40 is then adjusted so that the signal output of sensing device 24 and 35 are equalized to show a zero reading on galvanometer 41. This condition is indicated by the graph shown in FIG. 2 where the horizontal component of the graph is indicative of frequency and the vertical component is indicative of intensity or amptitude. The dotted indication at 48 indicates the characteristic frequency of the element view. If mercury were the selected element the dotted indication 48 would indicate the frequency of 1.014 microns. The first spike of the graph indicated at 50 indicates the signal output as seen by detector 24 and the second spike indicated at 51 indicates the signal output as seen by detector 35.

Figure 2:
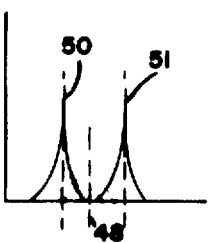
FIG. 2 is a graph showing the relative signal output from the two detectors when the sighted object is viewed at rest.

It can thus be seen that in the graph of FIG. 2 that when the object is at rest that spikes 50 and 51 are of substantially equal magnitude or amplitude.

Figure 3:
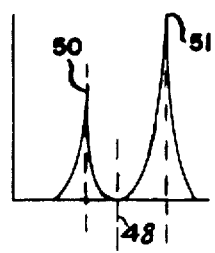
FIG. 3 is a similar graph showing the relative output of the two detectors when the sighted object is moving away from the speed detector.

When the object is then moved toward the sensing device the apparent frequency will increase. Therefore the amount of radiation passing through filter path 20 will increase as seen in the graph of FIG. 3 at spikes 51. This is because the apparent frequency more closely approaches the tuned frequency of the filter for light passing through the filter in path 20. Thus the galvanometer 41 would provide a positive reading which would show the difference of voltage values between spike 50 and spike 51. The positive reading indicates that the sighted element is moving toward the viewer and the differential between the voltage value between spikes 50 and 51 indicated by galvanometer 41 is a direct analogue of the speed of the sighted object.

Figure 4:
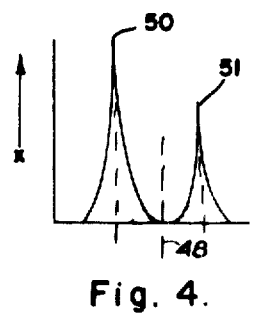
FIG. 4 is a similar graph showing the relative output of the two detectors with the sighted object moving toward the opposite detector.

If the sighted object is moved in the opposite direction the frequency will decrease thus providing a greater transmission to detector 35 as indicated in FIG. 4 at spike 50 and a lesser light transmission to detector 24 as shown by spike 51. This will create a negative indication by galvanometer 41 which is indicative of the sighted object moving away from the sighting device and the differential between the intensity of spikes 50 anl 51 is a direct analogue of the speed that the object is moving from the sighting source.

It is obvious that filter 23 can be tuned to measure the radiation output from any light emitting source, infrared or otherwise, provided that the characteristic frequency of the source is lower than the tuned frequency of the filter to light passing through the filter at right angles to the broad face of the filter.

It is also believed apparent that modifications of this device could be employed employing several filters having one tuned to a frequency below the characteristic frequency of the sighted element and the other filter tuned to an equal variation above the characteristic frequency of the sighted element.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. A method of determining the speed of an infrared radiation emitting element traveling toward or away from a reference point having the steps of: collecting infrared radiation from said element; filtering a first portion of collected radiation through a first filtered path tuned to a frequency below the characteristic frequency of the infrared radiation emanating from the element; filtering a second portion of the collected radiation through a second filtered path tuned to a frequency slightly above the characteristic frequency of the infrared radiation emanating from the element; sensing the amount of infrared radiation passing through the first filtered path; sensing the intensity of infrared radiation passing through the second filtered path; and comparing the amount of radiation sensed from said first path and said second path to obtain a differential reading therefrom.

2. A method of determing the speed of an infrared radiation emitting element traveling toward or away from a reference point having the steps of: collecting infrared radiat.on from said element; filtering a first portion of collected radiation tthrough a first filtered path tuned to a frequency below the characteristic frequency of the infrared radiation emanating from the element; filtering a sccond portion of the collected radiation through a second filtered path tuned to a frequency slightly above the characteristic frequency of the infrared radiation emanating from the element; sensing the amount of infrared radiation passing through the first filtered path; sensing the intensity of infrared radiation passing through the second filtered path; converting the infrared radiation sensed from each said path into electrical energy; cancelling the electrical energy from said first path with electrical energy from said second path; and adjusting the electrical energy from said first path to equal the electrical energy from said second path when the element is at rest.

3. A method of determining the speed of an infrared radiation emitting element traveling toward or away from a reference point having the steps of: collecting infrared radiation from said element; splitting the collected radiation into two beams; forming a narrow band pass filter to pass maximum infrared radiation at a frequency slightly about the characteristic frequency of the element when the radiation is passed at an angle substantially normal to the broad face of the filter; passing a first one of said two beams through the filter at an angle substantially normal to the broad face of the filter; passing the second beam through the filter at an angle other than normal to the broad face of the filter; adjusting said angle to allow the filter to pass maximum infrared radiation at a frequency slightly below the characteristic frequency of the element; and sensing the relative intensity of infrared radiation of said first and second beams passing through said filter.

4. In a device for measuring the relative speed that an infrared radiation producing element having a predetermined characteristic frequency moves toward or away from the device the combination of: first filter path means having a narrow band pass to infrared radiation transmission at a frequency slightly above the characteristic frequency of the element; second filter path means having a narrow band pass to infrared radiation transmission at a frequency slightly lower than the characteristic frequency of the element; means to collect infrared radiation from said element; means to direct a portion of the radiation collected by said collecting means through said first filter path means and a second portion of the radiation collected through said second filter path means; first detector means to detect the intensity of radiation passing through said first filter path means and convert the radiation to electrical energy; second detector means to detect the intensity of radiation passing through said second filter path means and convert radiation to electrical energy; and means to compare the electrical energy output of said first and second detectors.

5. In a device for measuring the relative speed that an infrared radiation producing element having a predetermined characteristic frequency moves toward or away from the device the combination of: first filter path means having a narrow band pass to infrared radiation transmission at a frequency slightly above the characteristic frequency of the element; second filter path means having a narrow band pass to infrared radiation transmission at a frequency slightly lower than the characteristic frequency of the element; means to collect infrared radiation from said element; means to direct a portion of the radiation collected by said collecting means through said first filter path means and a second portion of the radiation collected through said second filter path means; first detector means to detect the intensity of radiation passing through said first filter path means and convert the radiation to electrical energy; second detector means to detect the intensity of radiation passing through said second filter path means and convert radiation to electrical energy; said first detector means being formed to provide electrical current having a first polarity; said second detector means being formed to provide an output having a second polarity; and means to apply the electrical energy output from said first detector in cancelling relationship with the electrical output from said second detector to obtain a differential reading therefrom.

6. In a device for measuring the relative speed that an infrared radiation producing element having a predetermined characteristic frequency moves toward or away from the device the combination of: means to collect radiation from said element; filter means having a narrow band pass to infrared radiation at a frequency slightly above the characteristic frequency of the element when the radiation is directed through said filter means at an angle substantially normal to the broad face of said filter means and at a frequency slightly below the characteristic frequency of the element when the radiation is directed through the filter means at an angle other than normal to the broad face of the filter means; and beam splitting means to split the collected radiation from said element into two beams to direct one beam through said filter at an angle substantially normal to the broad face of said filter and a second beam through said filter at an angle other than normal to the broad face of said filter.

7. In a device for measuring the relative speed that an infrared radiation producing element having a predetermined characteristic frequency moves toward or away from the device the combination of: means to collect radiation from said element; beam splitting means to split the collected radiation from said element into two beams and direct one of said two beams through said filter means at an angle substantially normal to the broad face of said filter means; reflecting means to direct the second of the two beams through said filter means at an angle other than normal to the broad face of said filter means; means to separately detect the radiation from each of said two beams through said filter means and convert the radiation to electrical energy; and means to apply the electrical energy derived from each of said beams in cancelling relationship to obtain a differential electrical energy output.

8. In a device for measuring the relative speed that an infrared radiation producing element having a predetermined characteristic frequency moves toward or away from the device the combination of: means to collect radiation from said element; beam splitting means to split the collected radiation from said element into first and second beams; filter means; means to pass the first of said beams through said filter means at a first angle and the second of said two beams through said filter means at a second angle; said filter constructed and arranged to provide a maximum infrared radiation transmission at a frequency above the characteristic frequency of said element for radiation passing through said filter at said first angle and passing maximum infrared radiation through said filter at a frequency below said characteristic frequency for said second angle; means to detect and compare the intensity of radiation passing through said filter at said first angle; second means to detect the intensity of radiation passing through said filter at said second angle; and comparing means to compare the output between said first and said second detector means.

9. In a device for measuring the relative speed that an infrared radiation producing element moves toward or away from the device the combination of: a filter means to split radiation from said element into two beams; and means to direct a first one of said beams through said filter at a first angle and the second one of said beams through said filter at a second angle.

References Cited in the file of this patent
UNITED STATES PATENTS

| | | |
|---|---|---|
| 2,705,758 | Kaprelian | Apr. 5, 1955 |
| 2,742,578 | Nicolson | Apr. 17, 1956 |
| 2,761,067 | Troy | Aug. 28, 1956 |
| 2,801,049 | Richmond | July 30, 1957 |
| 2,813,230 | Fruengel | Nov. 12, 1957 |
| 2,878,388 | Bergson | Mar. 17, 1959 |
| 2,941,444 | Frykinan | June 21, 1960 |

OTHER REFERENCES

Radar Offers Solution by Brantley, Electronics, November 1954, pages 146 to 150.